UNITED STATES PATENT OFFICE.

JOHN F. TYRRELL, OF NEW YORK, N. Y.

COMPOUND FOR SOUP.

SPECIFICATION forming part of Letters Patent No. 240,343, dated April 19, 1881.

Application filed November 17, 1880. (Specimens.)

*To all whom it may concern:*

Be it known that I, JOHN F. TYRRELL, of the city, county, and State of New York, have invented a new and useful Compound for the Preparation of Soup, of which the following is a specification.

This my invention is an improvement on that described in Letters Patent No. 233,716, of October 26, 1880, granted to me; and it consists of a compound made up of dried and pulverized meat, whether of flesh, fish, or fowl, dried and pulverized vegetables, and dried and pulverized seasoning, in such proportion as to make, when mixed with a certain proportion of water and boiled, a good and palatable soup.

To prepare the meat for the compound I separate and remove from it all the bone, gristle, bloody portions, or parts otherwise not perfectly sweet, and then dry it in a kiln or drying apparatus. The thus-dried meat I then grind or otherwise thoroughly pulverize, producing a powder consisting of the solid portion of the meat in very finely-divided portions. A soup compound constituting a new article of manufacture is thus produced possessing these advantages over all previous similar compounds—that it is a homogeneous dry powder, non-deliquescent, and permanently retains the aroma of the condiments used. This meat-powder is mixed in certain proportions with powdered vegetables, flour, or other farinaceous substances, and powdered seasoning, and with them forms a compound for the preparation of soup which, with water and a few minutes' boiling, makes a good soup.

The meat-powder is substituted for the meat-extract in the making of compound, as described in the patent referred to.

The formula according to which I prefer to mix the compound is as follows, to wit: three-eighths ounce meat, one-eighth carrot, one-eighth potato, one-eighth beans, one-eighth salt, one one-hundred-and-twenty-eighth ounce pepper, one one-hundred-and-twenty-eighth sage, three thirty-seconds rice, one two-hundred-and-fiftieth mace, all the ingredients being dried and powdered, as described, which, when added to six pints water and boiled for fifteen minutes, makes a good soup. The proportion and ingredients may, however, be slightly varied without departing from my invention.

What I claim as new, and desire to secure by Letters Patent, is—

As a new article of manufacture, the soup compound herein described, consisting of dried and pulverized meat or fish, dried and pulverized vegetables, and dried and pulverized condiments, forming a homogeneous dry powder, non-deliquescent, and possessing the aroma of the condiments used.

J. F. TYRRELL.

Witnesses:
JNO. Y. HALLOCK,
DANL. E. TUTHILL.